US009156457B2

(12) United States Patent
Kim

(10) Patent No.: US 9,156,457 B2
(45) Date of Patent: Oct. 13, 2015

(54) ELECTRO-HYDRAULIC BRAKE SYSTEM

(71) Applicant: MANDO CORPORATION, Pyeongtaek-si (KR)

(72) Inventor: Yong Kap Kim, Suwon-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 44 days.

(21) Appl. No.: 13/873,194

(22) Filed: Apr. 29, 2013

(65) Prior Publication Data

US 2013/0307322 A1 Nov. 21, 2013

(30) Foreign Application Priority Data

Apr. 30, 2012 (KR) ........................ 10-2012-0045398

(51) Int. Cl.
*B60T 13/14* (2006.01)
*B60T 13/16* (2006.01)
*B60T 7/04* (2006.01)
*B60T 13/66* (2006.01)
*B60T 13/68* (2006.01)
*B60T 8/40* (2006.01)

(52) U.S. Cl.
CPC ............... *B60T 13/161* (2013.01); *B60T 7/042* (2013.01); *B60T 8/4081* (2013.01); *B60T 13/146* (2013.01); *B60T 13/662* (2013.01); *B60T 13/686* (2013.01)

(58) Field of Classification Search
CPC ..... B60T 7/042; B60T 13/161; B60T 13/146; B60T 13/686; B60T 13/662; B60T 8/4081
USPC ............................ 303/10–11, 114.2, DIG. 11
See application file for complete search history.

(56) References Cited

U.S. PATENT DOCUMENTS

| 4,900,105 | A | * | 2/1990 | Burgdorf et al. | ............ 303/116.1 |
| 5,013,096 | A | * | 5/1991 | Ocvirk et al. | ............... 303/116.1 |
| 5,979,998 | A | * | 11/1999 | Kambe et al. | ............... 303/116.1 |

(Continued)

FOREIGN PATENT DOCUMENTS

KR 10-2010-0093069 8/2010
KR 10-2011-0011938 2/2011

OTHER PUBLICATIONS

Office action dated Aug. 14, 2013 from corresponding Korean Patent Application No. 10-2012-0045398 and its English translation by Google Translate.

*Primary Examiner* — Bradley King
(74) *Attorney, Agent, or Firm* — Ladas & Parry, LLP

(57) ABSTRACT

Disclosed is an electro-hydraulic brake system including a master cylinder to generate hydraulic pressure according to pedal force applied to a brake pedal, a reservoir provided at an upper portion of the master cylinder to store oil, an intermediate pressure accumulator to store hydraulic pressure, a first motor and a first pump to suction oil through a channel connected to the reservoir and discharge the suctioned oil to the accumulator to create hydraulic pressure in the intermediate pressure accumulator in braking, a second motor and a second pump provided at an output side of the intermediate pressure accumulator to increase responsiveness in braking, two hydraulic circuits, each of the hydraulic circuits being connected to two wheels, and a flow control valve and a pressure reducing valve provided between the intermediate pressure accumulator and the two hydraulic circuits to control pressure transmitted from the intermediate pressure accumulator to a wheel cylinder installed at each of the wheels.

7 Claims, 4 Drawing Sheets

(56) References Cited

U.S. PATENT DOCUMENTS

| | | | |
|---|---|---|---|
| 6,164,731 A * | 12/2000 | Nakazawa et al. | 303/116.1 |
| 6,174,033 B1 * | 1/2001 | Busch et al. | 303/10 |
| 6,402,264 B1 * | 6/2002 | Otomo | 303/115.4 |
| 6,769,745 B2 * | 8/2004 | Mohr et al. | 303/116.4 |
| 7,185,956 B2 * | 3/2007 | Reuter et al. | 303/116.1 |
| 7,296,861 B2 * | 11/2007 | Ohlig et al. | 303/15 |
| 7,673,948 B2 * | 3/2010 | Otomo | 303/114.1 |
| 7,766,626 B2 * | 8/2010 | Pabst et al. | 417/273 |
| 2008/0284242 A1 | 11/2008 | Ganzel | |
| 2011/0241417 A1 * | 10/2011 | Miyazaki et al. | 303/2 |
| 2013/0062932 A1 * | 3/2013 | Yagashira | 303/3 |

* cited by examiner

ELECTRO-HYDRAULIC BRAKE SYSTEM

CROSS-REFERENCE TO RELATED APPLICATION

This application claims priority to Korean Patent Application No. 10-2012-0045398, filed on Apr. 30, 2012 in the Korean Intellectual Property Office, the disclosure of which is incorporated herein by reference in its entirety.

BACKGROUND

1. Field

Embodiments of the present invention relate to an electro-hydraulic brake system in which a less expensive intermediate pressure accumulator is usable instead of an expensive high pressure accumulator.

2. Description of the Related Art

Recently, development of hybrid vehicles, fuel cell vehicles and electric vehicles has been vigorously carried out in order to improve fuel efficiency and reduce exhaust gas. These vehicles essentially require a brake device which functions to decelerate or stop the vehicle.

In general, brake devices for an electronic brake system include a vacuum brake which generates braking force using suction pressure of an engine, and a hydraulic brake which generates braking force using hydraulic pressure.

The vacuum brake allows a vacuum booster to produce a large braking force from a small force using a difference between suction pressure of the vehicle engine and atmospheric pressure. That is, the vacuum brake generates an output force greater than the force applied to a brake pedal when a driver pushes the brake pedal. However, for the vacuum brake, suction pressure of the vehicle engine needs to be supplied to the vacuum booster to create a vacuum, and therefore, fuel efficiency may be lowered. Further, the engine may need to be driven to create a vacuum even when the vehicle is stopped.

Furthermore, the fuel cell vehicle and the electric vehicle have no engine and thus application of the conventional vacuum brake which boosts the driver's pedal force during braking may not be possible. For the hybrid vehicle, idle stop may need to be performed during stopping to improve fuel efficiency. Therefore, a hydraulic brake may need to be introduced.

FIG. 1 shows an electro-hydraulic brake system which is a kind of hydraulic brake. For the electro-hydraulic brake system, once a driver pushes a pedal, an electronic control unit senses displacement of the pedal through a pedal displacement sensor and calculates wheel pressure to perform feedback control for each wheel.

As shown in FIG. 1, the electro-hydraulic brake system includes, an actuator 1 including a master cylinder 1a, a booster 1b, a reservoir 1c and a pedal simulator 1d, a modulator module 2 to independently control braking force to each wheel, and a hydraulic power unit (HPU) module 3 including a motor, a pump, an accumulator and a control valve, so as to control hydraulic pressure transmitted to wheel cylinders 20. Depending on the brake control manner, an anti-lock brake system (ABS), a traction control system (TCS), an electronic stability control (ESC) system, or a vehicle dynamic control (VDC) system may be selectively applied to the modulator module 2.

The accumulator provided for the HPU module 3, which is a high pressure accumulator that uses expansion force of a high pressure gas such as nitrogen and is thus expensive, may be a cause of increase in manufacturing costs.

SUMMARY

Therefore, it is an aspect of the present invention to provide an electro-hydraulic brake system which uses a less expensive intermediate pressure accumulator instead of an expensive high pressure accumulator, while having fast responsiveness.

Additional aspects of the invention will be set forth in part in the description which follows and, in part, will be obvious from the description, or may be learned from practice of the invention.

In accordance with one aspect of the present invention, an electro-hydraulic brake system includes a master cylinder to generate hydraulic pressure according to pedal force applied to a brake pedal, a reservoir provided at an upper portion of the master cylinder to store oil, an intermediate pressure accumulator to store hydraulic pressure, a first motor and a first pump to suction oil through a channel connected to the reservoir and discharge the suctioned oil to the accumulator to create hydraulic pressure in the intermediate pressure accumulator in braking, a second motor and a second pump provided at an output side of the intermediate pressure accumulator to increase responsiveness in braking, two hydraulic circuits, each of the hydraulic circuits being connected to two wheels, and a flow control valve and a pressure reducing valve provided between the intermediate pressure accumulator and the two hydraulic circuits to control pressure transmitted from the intermediate pressure accumulator to a wheel cylinder installed at each of the wheels.

The second motor and the second pump may operate when a hydraulic pressure created at the wheel cylinders exceeds an operating pressure of the intermediate pressure accumulator.

The electro-hydraulic brake system may further include a check valve provided at the output side of the intermediate pressure accumulator, wherein the second pump may be connected to a position between the check valve and the flow control valve.

The second motor and the second pump may be provided as a single unit, wherein a shut off valve may be provided between the first motor and the first pump to selectively drive the first pump or the second pump.

The electro-hydraulic brake system may further include a check valve provided at the output side of the intermediate pressure accumulator, wherein the second pump may be connected to a position between the check valve and the flow control valve.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
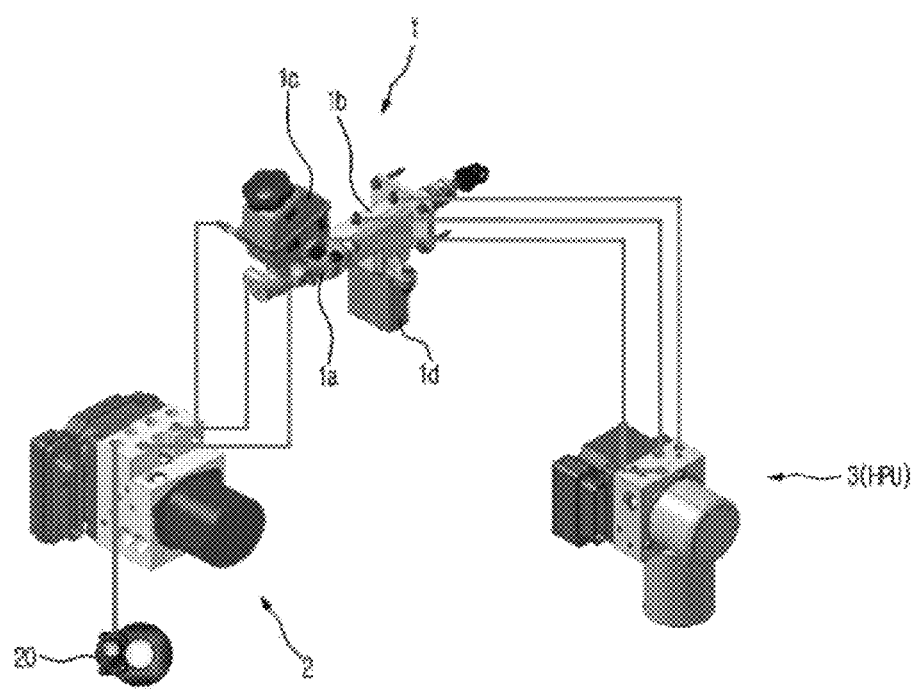
FIG. 1 is a view schematically illustrating a conventional electro-hydraulic brake system.

Reference will now be made in detail to the embodiments of the present invention, examples of which are illustrated in the accompanying drawings, wherein like reference numerals refer to like elements throughout. As described above, an electro-hydraulic brake system of the present invention uses an intermediate pressure accumulator instead of a high pressure accumulator which is often used for a common electro-hydraulic brake system. To assist understanding of the present invention, a hydraulic circuit diagram of a common electro-hydraulic brake system will first be described.

Figure 2:
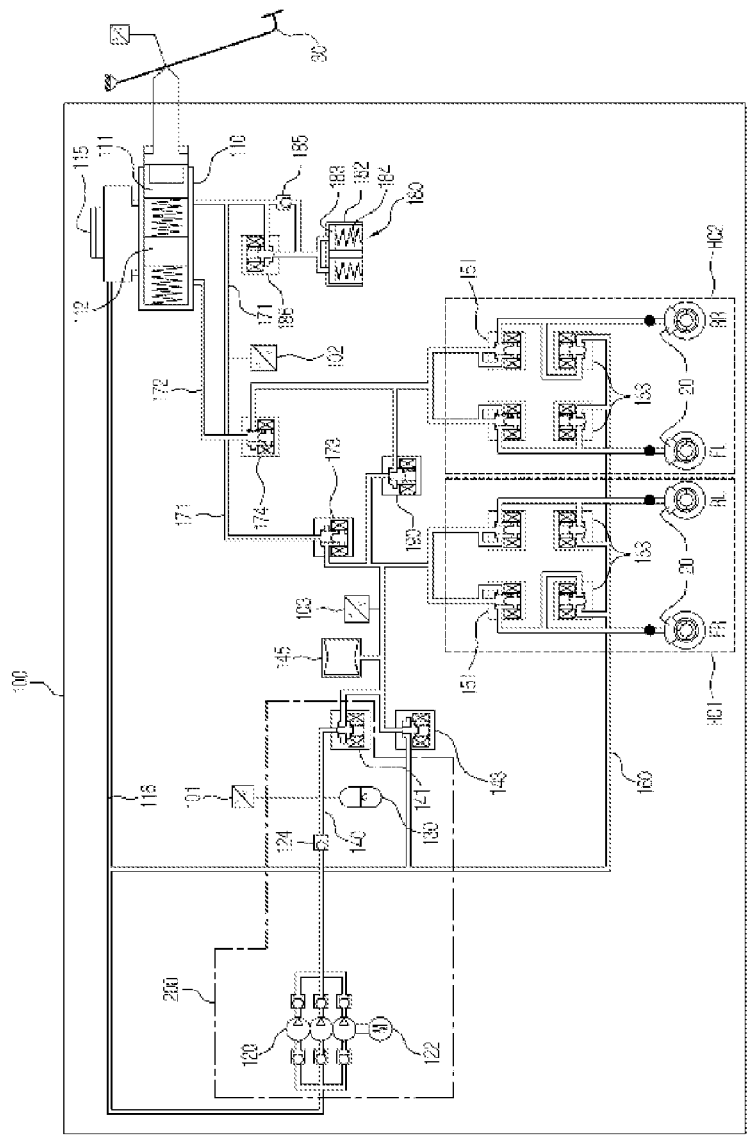
FIG. 2 is a hydraulic circuit diagram of an electro-hydraulic brake system to which an intermediate pressure accumulator according to an exemplary embodiment of the present invention is applied.

FIG. 2 shows a hydraulic circuit diagram of an electro-hydraulic brake system to which an intermediate pressure accumulator according to an exemplary embodiment of the present invention is applied. Referring to FIG. 2, the electro-hydraulic brake system 100 includes a brake pedal 30 manipulated by a driver during braking, a master cylinder 110, force from the brake pedal 30 being transmitted thereto, a reservoir 115 coupled to the upper portion of the master cylinder 110 to store oil, two hydraulic circuits HC1 and HC2 connected to wheel cylinders 20 each installed at two wheels FR, RL, FL and RR, an accumulator 130 to store a predetermined level of pressure, a pump 120 to suction oil from the reservoir 115 and discharge the suctioned oil to the accumulator 120 to generate pressure in the accumulator 130 and a motor 122 to drive the pump 120, pressure sensors 101, 102 and 103 to connect the accumulator 130 to each of the two hydraulic circuits HC1 and HC2 to control pressure transmitted to the cylinders 20, a flow control valve 141, a pressure reducing valve 143, a pedal simulator 180 connected to the master cylinder 110 to provide reaction force of the brake pedal 30, and a balance valve 190 to connect the two hydraulic circuits HC1 and HC2 to control pressure difference between the hydraulic circuits HC1 and HC2.

Although not described in the illustrated embodiment, the pump 120 and the motor 122 may be provided separately from the electro-hydraulic brake system 100 and connected to the electro-hydraulic brake system 100 through pipes. When the pump and the motor are installed as a separate unit, operating noise generated therefrom may be isolated and thus the noise level may be lowered. In addition, when the master cylinder 110, the reservoir 115, and the pedal simulator 180 are incorporated as a single unit and provided with functions of an ESC and HPU modules, the total weight of the electro-hydraulic brake system may be reduced and the installation space for the electro-hydraulic brake system may be enhanced.

In the illustrated embodiment, the master cylinder 110, which may be provided with a single chamber to generate hydraulic pressure, has two chambers to secure safety in case of malfunction. The chambers are provided therein with a first piston 111 and a second piston 112. The first and second pistons 111 and 112 generate hydraulic pressure according to pedal force of the brake pedal 30 and are connected respectively to the two hydraulic circuits HC1 and HC2. The master cylinder 110 receives oil supplied from the oil reservoir 115 arranged on the upper portion thereof and discharges the received oil to the wheel cylinders 20 installed at the wheels FR, RL, FL and RR through the outlet provided at the lower portion thereof.

At least one pump 120 is provided to pump the oil introduced from the reservoir 115 at high pressure to generate braking pressure. The motor 122 to provide driving force to the pump 120 is arranged at one side of the pump 120. The motor 122 may be driven according to the pedal force of the brake pedal 30 reflecting a driver's intention to brake the vehicle which is transferred from the second pressure sensor 102, which will be described later, or a pedal displacement sensor.

The accumulator 130 is provided at the outlet of the pump 120 to temporarily store high-pressure oil generated by driving the pump 120. A check valve 124 is installed between the pump 121 and the accumulator 130 to prevent backflow of the high-pressure oil stored in the accumulator 130.

A first pressure sensor 101 is provided at the outlet of the accumulator 130 to measure oil pressure of the accumulator 130. When the oil pressure measured by the first pressure sensor 101 is lower than a predetermined pressure, an electronic control unit (not shown) drives the pump 120 to supply the oil from the reservoir 115 to the accumulator 130 to fill the accumulator 130.

The high-pressure braking oil stored in the accumulator 120 is moved to one of the hydraulic circuits HC1 and HC2 along the connection channel 140 having two branches, by the pump 120 and the motor 122. Referring to FIG. 2, a connection channel 140 is connected to the first hydraulic circuit HC1. The connection channel 140 is provided with a flow control valve 141 and a pressure reducing valve 143 to control braking oil stored in the accumulator 120.

The flow control valve 141 and the pressure reducing valve 143 are normally closed-type solenoid valves which remain closed in normal times. Thereby, when the driver applies force to the brake pedal 30, the flow control valve 141 opens and allows the braking oil stored in the accumulator 120 to be transferred to the wheel cylinders 20. The flow control valve 141 and the pressure reducing valve 143 are configured with single valves to supply braking pressure and thus have high capacities. However, embodiments of the present invention are not limited thereto. When the capacities are insufficient, two or move valves may be combined to configure those valves.

The electro-hydraulic brake system may further include a pulsation attenuator 145 provided in the connection channel 140 to minimize pressure pulsation. The pulsation attenuator 145 is a device to temporarily store oil to attenuate pulsation generated between the flow control valve 141 and the pressure reducing valve 143. The pulsation attenuator 145 is well known in the art to which the present invention pertains, and therefore a detailed description thereof will be omitted.

A third pressure sensor 103 is provided in the connection channel 140 to sense pressure transmitted to the hydraulic circuit HC1. The pulsation attenuator 145 may be controlled to attenuate pressure pulsation according to the pressure of the braking oil sensed by the third pressure sensor 103.

Each of the hydraulic circuits HC1 and HC2 includes a channel connected to the corresponding wheel cylinder 20. A plurality of valves 151 and 153 is installed in the channel. The valves 151 and 153 include a normally open-type (hereinafter, NO type) solenoid valve 151 disposed upstream of the wheel cylinder 20 to control hydraulic pressure transferred to the wheel cylinder 20, and a normally closed-type (hereinafter, NC type) solenoid valve 153 disposed downstream of the wheel cylinder 20 to control decrease of hydraulic pressure in the wheel cylinder 20. The opening and closing of the two solenoid valves 151 and 153 may be controlled by an electronic control unit (not shown) that is commonly used.

In addition, each of the hydraulic circuits HC1 and HC2 includes a return channel 160 to connect the NC-type solenoid valve 153 and the reservoir 115. The return channel 160 allows the hydraulic pressure transferred to the wheel cylinder 20 to be discharged therethrough and transferred to the reservoir 115.

In preparation for malfunction of the electro-hydraulic brake system, a first backup channel 171 and a second backup channel 172 may be provided between the master cylinder 110 and the two hydraulic circuits HC1 and HC2. A first shut off valve 173 to open and close the first backup channel 171 is provided in the backup channel 171, and a second shut off valve 174 to open and close the second backup channel 172 is provided in the second backup channel 172. The first and second shut off valves 173 and 174 are NC type solenoid valves which remain open in normal times and are closed when braking is normally performed. The first backup channel 171 is connected to the first hydraulic circuit HC1 and the first shut off valve 173 via the first shut off valve 173, and the second backup channel 172 is connected to the second hydraulic circuit HC2 via the second shut off valve 174. The second pressure sensor 102 to measure the oil pressure of the master cylinder 110 may be provided between the first shut off valve 173 and the master cylinder 110. Thereby, when braking is normally performed, the backup channels 171 and 172 are shut off by the first shut off valve 173 and the second shut off valve 174, and the driver's braking intention may be determined by the second pressure sensor 102. In an abnormal state, braking pressure generated by master cylinder 110 is directly transmitted to the wheel cylinders 20 since the first and second shut off valves 173 and 173 and 174 are open.

The pedal simulator 180 to generate pedal force of the brake pedal 30 is provided between the second pressure sensor 102 and the master cylinder 110. The pedal simulator 180 includes a simulation chamber 182 to store oil discharged from the outlet of the master cylinder 110 and a simulation valve 186 provided at the inlet of the simulation chamber 182. The simulation chamber 182 includes a piston 183 and an elastic member 184, displacement of which is caused within a predetermined range by oil introduced into the simulation chamber 182. The simulation valve 186 is an NC type solenoid valve which remains closed in normal times. Accordingly, when the driver pushes the brake pedal 30, the simulation valve 186 is opened to transfer the braking oil to the simulation chamber 182.

In addition, a simulation check valve 185 is provided between the pedal simulator 180 and the master cylinder 110, i.e. between the pedal simulator 180 and the simulation valve 186. The simulation check valve 185 is connected to the master cylinder 110. The simulation check valve 185 is adapted to transmit pressure generated by pedal force of the brake pedal 30 to the pedal simulator 180 only through the simulation valve 186. As the simulation check valve 185, a pipe check valve having no spring may be used such that the remaining pressure of the pedal simulator 180 may be returned when the pedal force to the brake pedal 30 is released.

The balance valve 190 connects the two hydraulic circuits HC1 and HC2 and controls pressure difference between the two hydraulic circuits HC1 and HC2. The balance valve 190 is an NC type solenoid valve which remains closed in normal times and is opened when pressure difference occurs between the two hydraulic circuits HC1 and HC2 based on pressure information. That is, the balance valve 190 is allowed to independently control the two hydraulic circuits HC1 and HC2. In addition, when pressure difference between the two hydraulic circuits HC1 and HC2 occurs, the balance valve 190 may be opened to suppress the pressure difference, thereby improving braking stability.

Figure 3:
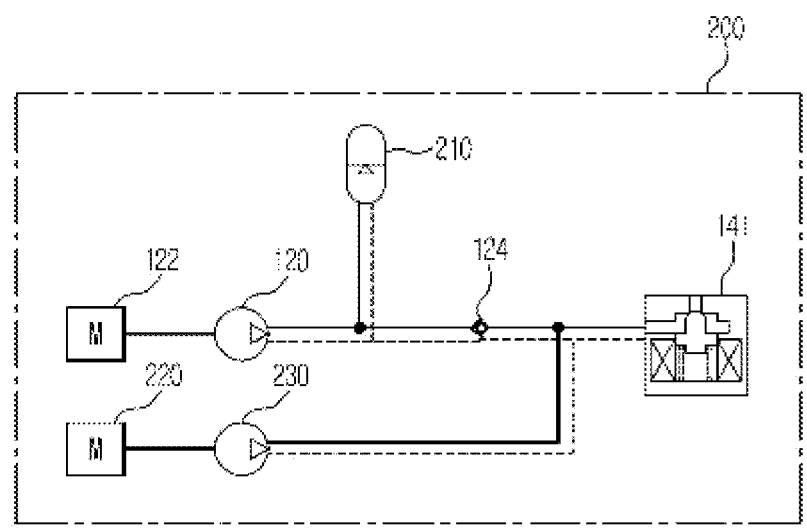
FIG. 3 is a partial block diagram illustrating an electro-hydraulic brake system according to an exemplary embodiment of the present invention, which uses a low pressure accumulator.

The illustrated embodiment employs an intermediate pressure accumulator 210 of FIG. 3 instead of the high pressure accumulator 130 of FIG. 2 for a common electro-hydraulic brake system, and thereby may reduce manufacturing costs and increase responsiveness with the intermediate pressure accumulator 210.

To this end, a block 200 of the electro-hydraulic brake system of FIG. 2 may be replaced by the one shown in FIG. 3. The other constituents of the electro-hydraulic brake system except the block 200 are the same and thus a detailed description thereof will be omitted. Hereinafter, the motor 122 will be referred to as the first motor and the pump 120 will be referred to as the first pump.

The intermediate pressure accumulator 210 has an operating pressure between about 50 bar and about 100 bar, and includes a piston and a spring. The operating pressure at which the intermediate pressure accumulator 210 is used is between about 100 bar and about 180 bar, and the cost of the intermediate pressure accumulator 210 is lower than that of a high pressure accumulator.

The pressure energy stored in the intermediate pressure accumulator 210 secures the rate of pressure increase at the initial stage of braking. When pressure to be created at the wheels is higher than the operating pressure of the intermediate pressure accumulator 210, the second motor 220 and the second pump 230 located downstream of the intermediate pressure accumulator 210 are connected to increase the pressure. To block the connection channel 140 between the intermediate pressure accumulator 210 and the wheels when the second pump 230 is driven, the second pump 230 is connected to a position between the check valve 124 and the NC-type flow control valve 141 provided at the output side of the intermediate pressure accumulator 210. In FIG. 3, the dotted line represents the region of oil pressure between 0 bar and 100 bar, and the double dotted line represents paths of oil pressure between 0 bar and 18 bar.

Figure 4:
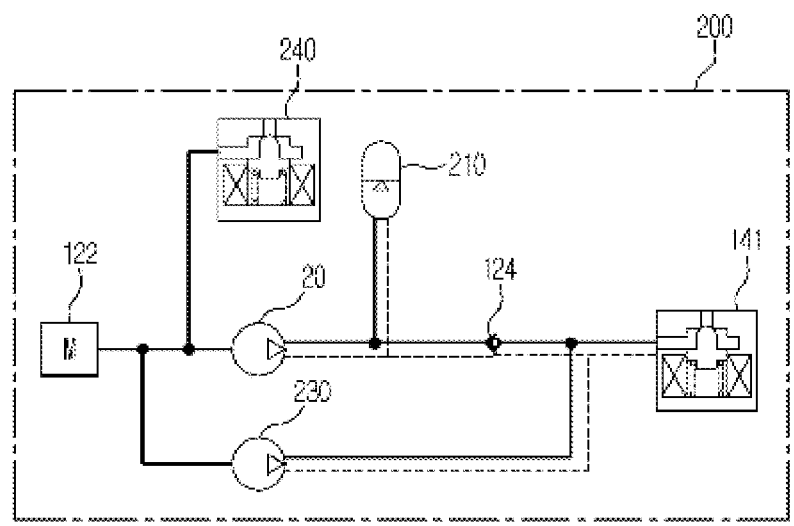
FIG. 4 is a partial block diagram illustrating an electro-hydraulic brake system according to another embodiment of the present invention, which uses a low pressure accumulator.

FIG. 4 is a view schematically illustrating an electro-hydraulic brake system according to another embodiment of the present invention. Hereinafter, features different from those in the previous embodiment will be mainly described, and a description of constituents having the same symbols, which perform the same functions as in the previous embodiment, will be omitted.

In the illustrated embodiment, the electro-hydraulic brake system selectively drives the first pump 120 or the second pump 230 using only the first motor 122. That is, when pressure to be created at the wheels is higher than the operating pressure of the intermediate pressure accumulator 210, the first pump 120 is disconnected, while the second pump 230 is connected to the first motor 122 to increase the pressure to a desired level. Release of connection between the first motor 122 and the first pump 120 may be implemented by an electronic shut off valve 240 such as an emergency shutdown valve (ESV). To block the connection channel 140 between the intermediate pressure accumulator 210 and the wheels when the second pump 230 is driven, the second pump 230 is connected to a position between the check valve 124 and the NC-type flow control valve 141 provided at the output side of the intermediate pressure accumulator 210.

As is apparent from the above description, an electro-hydraulic brake system according to an embodiment of the present invention may lower manufacturing costs by using a less expensive intermediate pressure accumulator instead of an expensive high pressure accumulator, and further have good responsiveness as a second pump is allowed to promptly increase pressure when the operating pressure of the brake is higher than the operating pressure of the intermediate pressure accumulator.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electro-hydraulic brake system comprising:
   a master cylinder to generate hydraulic pressure according to pedal force to a brake pedal;
   a reservoir provided at an upper portion of the master cylinder to store oil;
   an intermediate pressure accumulator to store hydraulic pressure;
   a first motor and a first pump to suction oil through a channel connected to the reservoir and discharge the suctioned oil to the accumulator to create hydraulic pressure in the intermediate pressure accumulator in braking;
   a second motor and a second pump coupled to an output side of the intermediate pressure accumulator to increase responsiveness in braking;
   two hydraulic circuits, each of the hydraulic circuits being connected to two wheels;
   a flow control valve and a pressure reducing valve provided between the intermediate pressure accumulator and the two hydraulic circuits to control pressure transmitted from the intermediate pressure accumulator to a wheel cylinder installed at each of the wheels; and
   a check valve provided at the output side of the intermediate pressure accumulator,
   wherein the intermediate pressure accumulator is disposed between the first pump and the check valve.

2. The electro-hydraulic brake system according to claim 1, wherein the second motor and the second pump operate when a hydraulic pressure created at the wheel cylinders is higher than an operating pressure of the intermediate pressure accumulator.

3. The electro-hydraulic brake system according to claim 2, wherein the second pump is connected to a position between the check valve and the flow control valve.

4. The electro-hydraulic brake system according to claim 2, wherein the first motor and the second motor are provided as a single unit,
   wherein a shut off valve is provided between the first motor and the first pump.

5. The electro-hydraulic brake system according to claim 4, wherein the second pump is connected to a position between the check valve and the flow control valve.

6. The electro-hydraulic brake system of claim 1, wherein the intermediate pressure accumulator configured to have an operating pressure between about 50 and 100 bar.

7. The electro-hydraulic brake system of claim 1, wherein the intermediate pressure accumulator configured to have an operating pressure between about 100 and 180 bar.

* * * * *